United States Patent
Inoshita et al.

(10) Patent No.: US 12,165,355 B2
(45) Date of Patent: Dec. 10, 2024

(54) POSE ESTIMATION APPARATUS, LEARNING APPARATUS, POSE ESTIMATION METHOD, AND NON-TRANSITORY COMPUTER-READABLE RECORDING MEDIUM

(71) Applicant: NEC Corporation, Tokyo (JP)

(72) Inventors: Tetsuo Inoshita, Tokyo (JP); Yuichi Nakatani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 349 days.

(21) Appl. No.: 17/672,884

(22) Filed: Feb. 16, 2022

(65) Prior Publication Data
US 2022/0277473 A1    Sep. 1, 2022

(30) Foreign Application Priority Data
Feb. 26, 2021   (JP) ................. 2021-030329

(51) Int. Cl.
*G06T 7/73*     (2017.01)
*G06V 10/22*    (2022.01)
(Continued)

(52) U.S. Cl.
CPC ............... *G06T 7/73* (2017.01); *G06V 10/22* (2022.01); *G06V 10/44* (2022.01); *G06V 10/774* (2022.01);
(Continued)

(58) Field of Classification Search
CPC ............ G06T 7/73; G06T 2207/20081; G06T 2207/30196; G06V 40/103; G06V 10/44; G06V 10/22; G06V 10/774
(Continued)

(56) References Cited

U.S. PATENT DOCUMENTS

2020/0245904 A1*  8/2020  Ikeda ................... A61B 5/1114
2022/0383639 A1* 12/2022  Javan Roshtkhari .. G06V 20/42

FOREIGN PATENT DOCUMENTS

JP    2019-144830 A    8/2019
JP    2022-092528 A    6/2022

OTHER PUBLICATIONS

Ashish Vaswani et al., "Attention Is All You Need", [online], [searched on Jan. 22, 2021], Internet <URL: https://papers.nips.cc/paper/2017/file/3f5ee243547dee91fbd053c1c4a845aa-Paper.pdf>, 31st Conference on Neural Information Processing Systems (NIPS 2017), USA.

(Continued)

*Primary Examiner* — Michael R Neff

(57) ABSTRACT

To improve pose estimation accuracy, a pose estimation apparatus according to the present invention extracts a person area from an image, and generates person area image information, based on an image of the extracted person area. The pose estimation apparatus according to the present invention further extracts a joint point of a person from the image, and generates joint point information, based on the extracted joint point. Then, the pose estimation apparatus according to the present invention generates feature value information, based on both of the person area image information and the joint point information. Then, the pose estimation apparatus according to the present invention estimates a pose of a person included in the image, based on an estimation model in which the feature value information is an input, and pose estimation result is an output.

6 Claims, 13 Drawing Sheets

(51) Int. Cl.
*G06V 10/44* (2022.01)
*G06V 10/774* (2022.01)
*G06V 40/10* (2022.01)

(52) U.S. Cl.
CPC .. *G06V 40/103* (2022.01); *G06T 2207/20081* (2013.01); *G06T 2207/30196* (2013.01)

(58) Field of Classification Search
USPC .......................................................... 382/103
See application file for complete search history.

(56) References Cited

OTHER PUBLICATIONS

JP Office Action for Japanese Patent Application No. 2021-030329, mailed on Aug. 13, 2024 with English Translation.

\* cited by examiner

POSE ESTIMATION APPARATUS, LEARNING APPARATUS, POSE ESTIMATION METHOD, AND NON-TRANSITORY COMPUTER-READABLE RECORDING MEDIUM

TECHNICAL FIELD

The present invention relates to a pose estimation apparatus, a learning apparatus, a pose estimation method, and a program.

BACKGROUND ART

A technique associated with the present invention is disclosed in Patent Document 1. Patent Document 1 discloses a technique for integrating a score of each of a plurality of classes computed by an engine that estimates a behavior of a person included in an image by an image analysis, and a score of each of a plurality of classes computed by an engine that estimates a behavior of a person included in an image, based on joint point information, and computing an integrated score of each of the plurality of classes.

Non-Patent Document 1 is a document relating to a Transformer, which is an estimation model provided with a self-attention mechanism.

RELATED DOCUMENT

Patent Document

[Patent Document 1] Japanese Patent Application Publication No. 2019-144830

Non-Patent Document

[Non-Patent Document 1] Ashish Vaswani et al., "Attention Is All You Need", [online], [searched on Jan. 22, 2021], Internet <URL:
https://papers.nips.cc/paper/2017/file/
3f5ee243547dee91fbd053c1c4a845aa-Paper.pdf>

DISCLOSURE OF THE INVENTION

Technical Problem

In a case of the technique disclosed in Patent Document 1, after class classification based on image information and class classification based on joint point information are individually performed, a result of each class classification is integrated. As described in the following example embodiments, in a case of processing in which a result of class classification that has been performed individually is simply integrated as described above, an accuracy improvement rate is low. An object of the present invention is to improve accuracy of pose estimation.

Solution to Problem

The present invention provides a pose estimation apparatus including:
a person area image information generation means for extracting a person area from an image, and generating person area image information, based on an image of the extracted person area;
a joint point information generation means for extracting a joint point of a person from the image, and generating joint point information, based on the extracted joint point;
a feature value information generation means for generating feature value information, based on both of the person area image information and the joint point information; and
an estimation means for estimating a pose of a person included in the image, based on an estimation model in which the feature value information is an input, and a pose estimation result is an output.

Further, the present invention provides a pose estimation method including:
by a computer:
extracting a person area from an image, and generating person area image information, based on an image of the extracted person area;
extracting a joint point of a person from the image, and generating joint point information, based on the extracted joint point;
generating feature value information, based on both of the person area image information and the joint point information; and
estimating a pose of a person included in the image, based on an estimation model in which the feature value information is an input, and a pose estimation result is an output.

Further, the present invention provides a program causing a computer to function as:
a person area image information generation means for extracting a person area from an image, and generating person area image information, based on an image of the extracted person area;
a joint point information generation means for extracting a joint point of a person from the image, and generating joint point information, based on the extracted joint point;
a feature value information generation means for generating feature value information, based on both of the person area image information and the joint point information; and
an estimation means for estimating a pose of a person included in the image, based on an estimation model in which the feature value information is an input, and a pose estimation result is an output.

Further, the present invention provides a learning apparatus including:
a person area image information generation means for extracting a person area from an image, and generating person area image information, based on an image of the extracted person area;
a joint point information generation means for extracting a joint point of a person from the image, and generating joint point information, based on the extracted joint point;
a feature value information generation means for generating feature value information, based on both of the person area image information and the joint point information; and
a learning means for learning an estimation model in which the feature value information is an input, and a pose estimation result is an output.

Advantageous Effects of the Invention

According to the present invention, accuracy of pose estimation is improved.

DESCRIPTION OF EMBODIMENTS

In the following, example embodiments according to the present invention are described by using the drawings. Note that, in every drawing, a similar component is designated with a similar reference sign, and description thereof is omitted as necessary.

First Example Embodiment

Overview

The present example embodiment relates to a learning apparatus that learns an estimation model in which a pose of a person included in an image to be processed is estimated.

Figure 1:
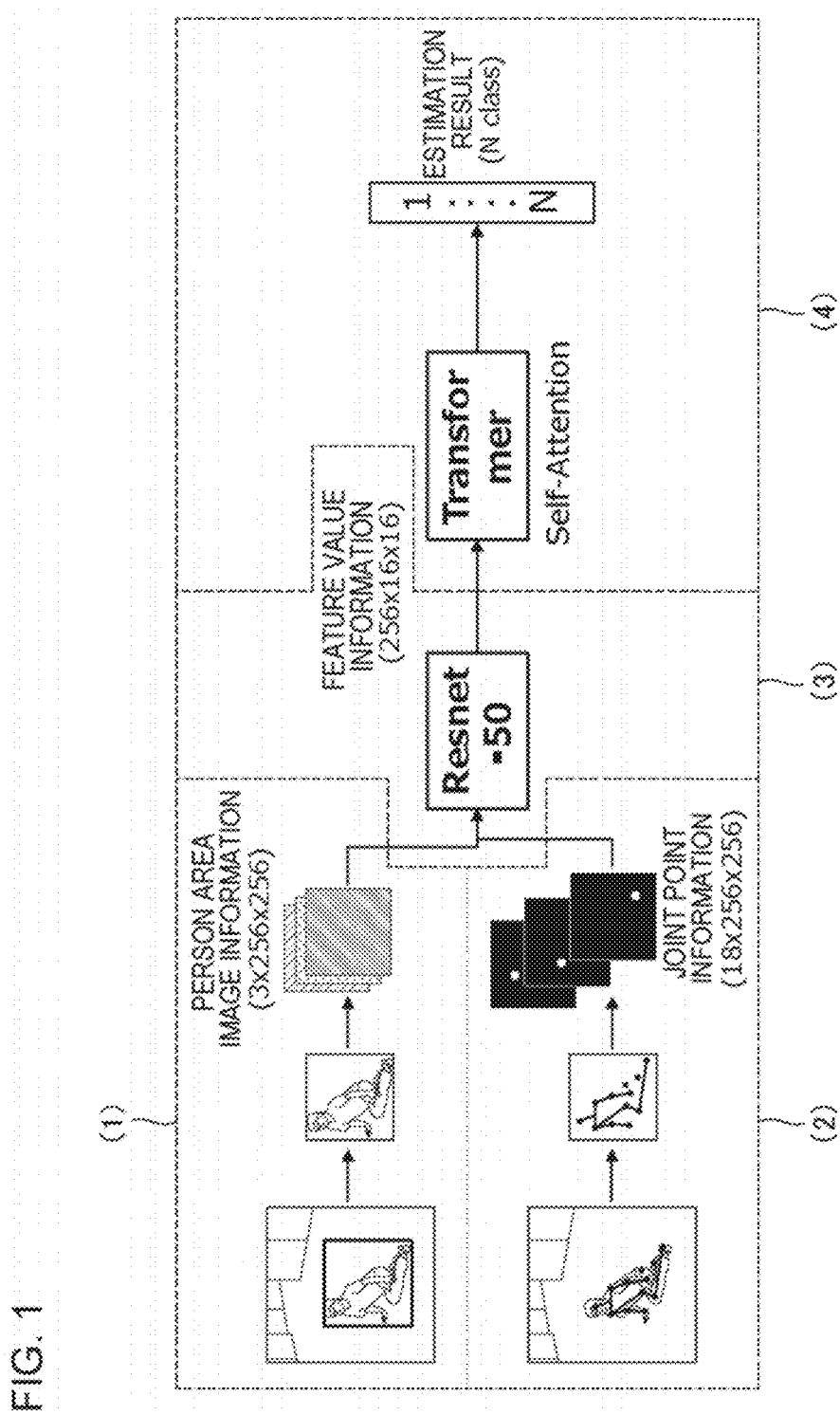
FIG. 1 is a diagram illustrating an overall image of processing to be performed by a learning apparatus according to the present example embodiment.

FIG. 1 illustrates an overall image of processing to be performed by the learning apparatus according to the present example embodiment. As illustrated in FIG. 1, the learning apparatus according to the present example embodiment performs:

processing of extracting a person area from an image to be processed, and generating person area image information, based on an image of the extracted person area ((1) in FIG. 1);

processing of extracting a joint point of a person from the image to be processed, and generating joint point information, based on the extracted joint point ((2) in FIG. 1);

processing of generating feature value information by convoluting the person area image information and the joint point information ((3) in FIG. 1); and processing of learning the feature value information by a Transformer provided with a self-attention mechanism ((4) in FIG. 1).

In this way, the learning apparatus according to the present example embodiment performs characteristic processing of generating feature value information by convoluting person area image information and joint point information, and learning the feature value information by a Transformer provided with a self-attention mechanism.

Configuration of Learning Apparatus

Figure 2:
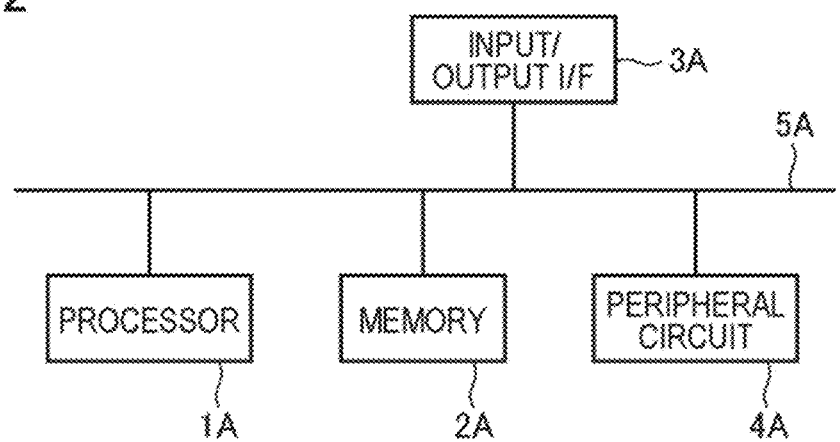
FIG. 2 is a diagram illustrating one example of a hardware configuration of the learning apparatus and a pose estimation apparatus according to the present example embodiment.

First, one example of a hardware configuration of the learning apparatus is described. FIG. 2 is a diagram illustrating a hardware configuration example of the learning apparatus. Each functional unit included in the learning apparatus is achieved by any combination of hardware and software, mainly including a central processing unit (CPU) of any computer, a memory, a program loaded in a memory, a storage unit (capable of storing, in addition to a program stored in advance at a shipping stage of an apparatus, a program downloaded from a storage medium such as a compact disc (CD), a server on the Internet, and the like) such as a hard disk storing the program, and an interface for network connection. It is understood by a person skilled in the art that there are various modification examples as a method and an apparatus for achieving the configuration.

As illustrated in FIG. 2, the learning apparatus includes a processor 1A, a memory 2A, an input/output interface 3A, a peripheral circuit 4A, and a bus 5A. The peripheral circuit 4A includes various modules. The learning apparatus does not have to include the peripheral circuit 4A. Note that, the learning apparatus may be configured by a plurality of apparatuses that are physically and/or logically separated, or may be configured by one apparatus that is physically and/or logically integrated. In the former case, each of the plurality of apparatuses constituting the learning apparatus can include the above-described hardware configuration.

The bus 5A is a data transmission path along which the processor 1A, the memory 2A, the peripheral circuit 4A, and the input/output interface 3A mutually transmit and receive data. The processor 1A is, for example, an arithmetic processing apparatus such as a CPU and a graphics processing unit (GPU). The memory 2A is, for example, a memory such as a random access memory (RAM) and a read only memory (ROM). The input/output interface 3A includes an interface for acquiring information from an input apparatus, an external apparatus, an external server, an external sensor, and the like, an interface for outputting information to an output apparatus, an external apparatus, an external server, and the like, and the like. The input apparatus is, for example, a keyboard, a mouse, a microphone, and the like. The output apparatus is, for example, a display, a speaker, a printer, a mailer, and the like. The processor 1A can issue a command to each module, and perform an arithmetic operation, based on an arithmetic operation result of each module.

Figure 3:
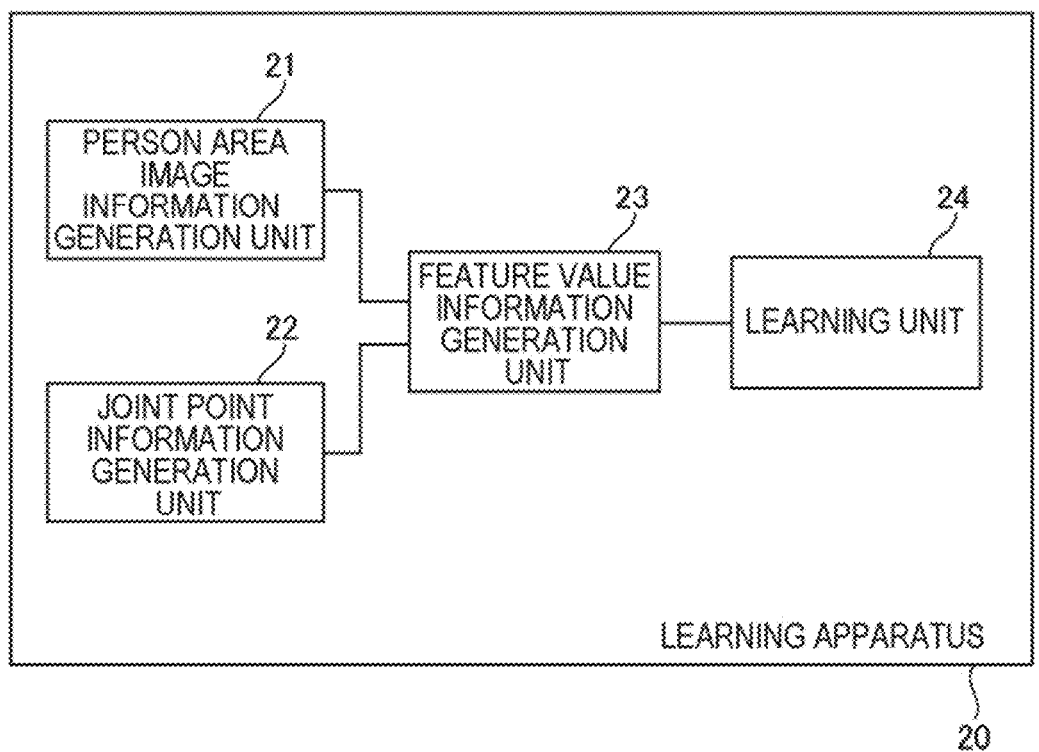
FIG. 3 is one example of a functional block diagram of the learning apparatus according to the present example embodiment.

Next, a functional configuration of the learning apparatus is described. FIG. 3 illustrates one example of a functional block diagram of a learning apparatus 20. As illustrated in FIG. 3, the learning apparatus 20 includes a person area image information generation unit 21, a joint point information generation unit 22, a feature value information generation unit 23, and a learning unit 24.

The person area image information generation unit 21 extracts a person area from an image to be processed, and generates person area image information, based on an image of the extracted person area.

Figure 4:
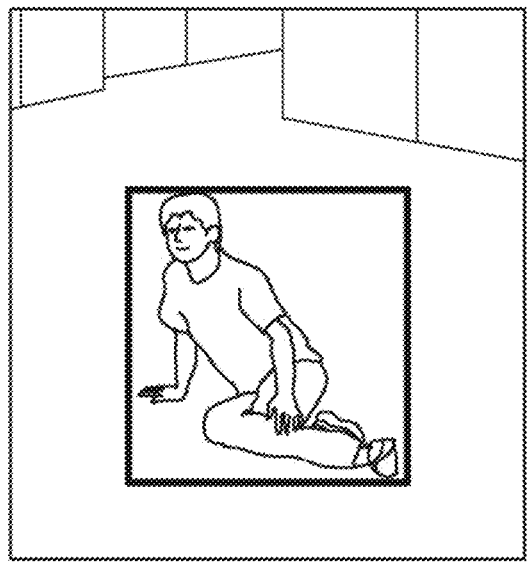
FIG. 4 is a diagram illustrating processing of a person area image information generation unit according to the present example embodiment.

The person area is an area where a person is present. For example, extraction of the person area may be achieved by using a result of well-known person detection processing (image analysis processing) of detecting a feature value of an external appearance such as a face from an image, or may be achieved by using a result of joint point extraction processing generated by the joint point information generation unit 22. FIG. 4 illustrates an example in which a person area is extracted from an image to be processed. An area surrounded by a frame is the extracted person area.

Next, person area image information is described. Each pixel of an image of an extracted person area has RGB information (color information). The person area image information is constituted of a R image indicating information of red (R) of the image of the extracted person area, a G image indicating information of green (G) of the image of the extracted person area, and a B image indicating information of blue (B) of the image of the extracted person area. Vertical and horizontal sizes of the R image, G image, and the B image are the same, and are set to a predetermined size. The image size is, for example, 256×256, but is not limited to the above. Note that, in a case where a size of an image of an extracted person area is different from the above-described predetermined size, it is possible to adjust the image size by well-known image correction processing such as enlargement and reduction.

Figure 5:
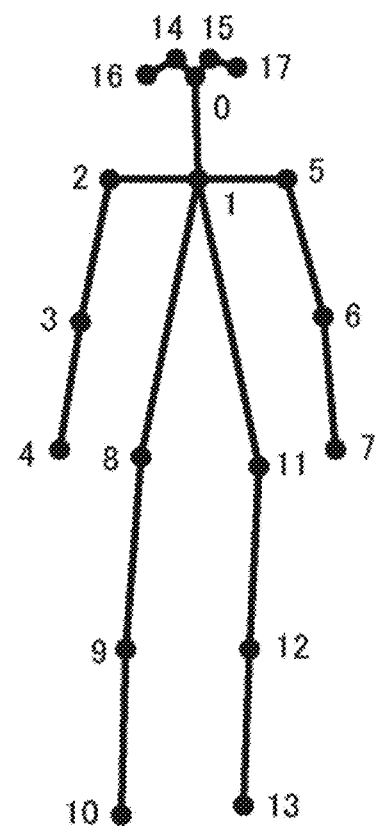
FIG. 5 is a diagram illustrating processing of a joint point information generation unit according to the present example embodiment.
Figure 6:
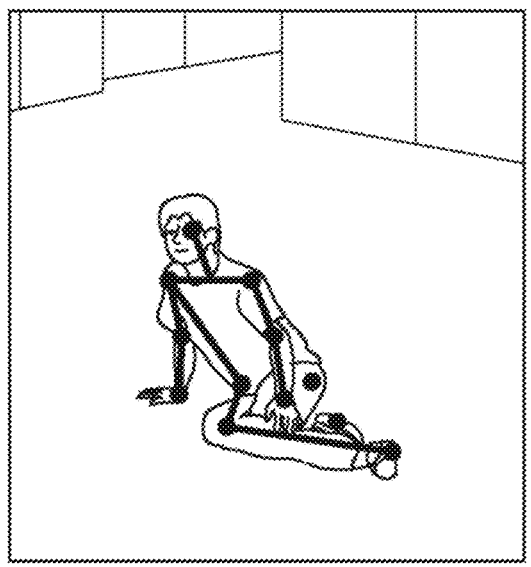
FIG. 6 is a diagram illustrating processing of the joint point information generation unit according to the present example embodiment.

The joint point information generation unit 22 extracts a joint point of a person from an image to be processed, and generates joint point information, based on the extracted joint point. Processing of extracting a joint point of a person by analyzing an image can be achieved by using conventionally available techniques (such as an Open Pose). According to the joint point information generation unit 22, for example, eighteen joint points as illustrated in FIG. 5 are extracted. Note that, the number of joint points to be extracted is a design matter. FIG. 6 illustrates an example in which joint points are extracted from an image to be processed. The extracted joint points are indicated by black dots.

Joint point information is constituted of joint point position images associated with each of a plurality of joint points to be extracted. In a case of using an engine in which M joint points are extracted, joint point information is constituted of M joint point position images. Since FIG. 1 is based on a premise that an engine in which eighteen joint points are extracted is used, FIG. 1 illustrates that joint point information is constituted of eighteen joint point position images. However, M=18 is merely one example, and the present example embodiment is not limited to the above.

Each joint point position image associated with each joint point indicates a position of each joint point, more specifically, a position of each joint point in an image of the above-described extracted person area. A first joint point position image associated with a first joint point indicates a position of the first joint point. The first joint point position image does not indicate a position of any other joint point. Likewise, a second joint point position image associated with a second joint point indicates a position of the second joint point. The second joint point position image does not indicate a position of any other joint point.

Herein, an example of a method of generating a joint point position image is described. First, the joint point information generation unit 22 determines a score for each of a plurality of coordinates in an image of the above-described extracted person area. As one example, a score of a coordinate associated with a position of a joint point, and a score of other coordinate are defined in advance by a fixed value. For example, a score of a coordinate associated with a position of a joint point is "1", and a score of other coordinate is "0". At a time of generating a first joint point position image associated with a first joint point, a score of a coordinate associated with a position of the first joint point becomes "1", and a score of other coordinate becomes "0". Then, at a time of generating a second joint point position image associated with a second joint point, a score of a coordinate associated with a position of the second joint point becomes "1", and a score of other coordinate becomes "0".

Then, the joint point information generation unit 22 generates a joint point position image in which a score of each coordinate is represented by a heatmap. As a modification example of the processing, a score of a coordinate in a periphery of a coordinate associated with a position of a joint point may be stepwise made closer to "0" by using a Gaussian distribution or the like. As a coordinate approaches the coordinate associated with the position of the joint point, a value of the coordinate becomes a value approximate to "1".

Note that, there is an engine that outputs, as an intermediate product, a joint point position image as described above, among engines that extract a joint point such as an Open Pose. In a case where such an engine is used, the joint point information generation unit 22 may acquire, as joint point information, the intermediate product (joint point position image).

A size of a joint point position image is the same size as that of the R image, G image, and the B image. However, in a case where person area image information and joint point position image information are input to convolutional neural networks different from each other in processing of generating feature value information to be described below, the size of the joint point position image may not be the same as that of the R image, G image, and the B image.

The feature value information generation unit 23 generates feature value information, based on both of person area image information (a R image, a G image, and a B image), and joint point information (M joint point position images). Specifically, the feature value information generation unit 23 generates a feature value map (feature value information) by convoluting a R image, a G image, a B image, and M joint point position images. Consequently, as illustrated in FIG. 1, for example, person area image information having a size of 3×256×256, and joint point information having a size of 18×256×256 are convoluted into a feature value map having a size of 256×16×16. Note that, the example is merely one example.

The feature value information generation unit 23 may, for example, generate feature value information by inputting, to one convolutional neural network (e.g., Resnet-50 or the like), a R image, a G image, a B image, and M joint point position images. In addition to the above, the feature value information generation unit 23 may generate one piece of feature value information by inputting, to one convolutional neural network, a R image, a G image, and a B image, generate another piece of feature value information by inputting, to one convolutional neural network, M joint point position images, and thereafter, generate one piece of feature value information by integrating these two pieces of feature value information by an optional means.

The learning unit 24 learns an estimation model in which feature value information is an input, and a pose estimation result is an output. The estimation model is a Transformer provided with a self-attention mechanism. Since details on the estimation model are disclosed in NPL 1, description thereof is omitted herein. The estimation model outputs, as an estimation result, a certainty of each of N poses (classes) that are defined in advance (a certainty with which a person included in an image to be processed takes each pose). The pose is, for example, falling, crouching, sitting, standing, walking, holding one's head, turning one's hand, shaking one's arm, and the like, however, the pose is not limited thereto.

The learning unit 24 acquires an estimation result (class classification result) by inputting, to the estimation model, feature value information generated by the feature value information generation unit 23. Then, the learning unit 24 adjusts a parameter of the estimation model, based on a collation result between the estimation result and a correct answer label. The learning processing can be achieved based on a conventional technique.

Figure 7:
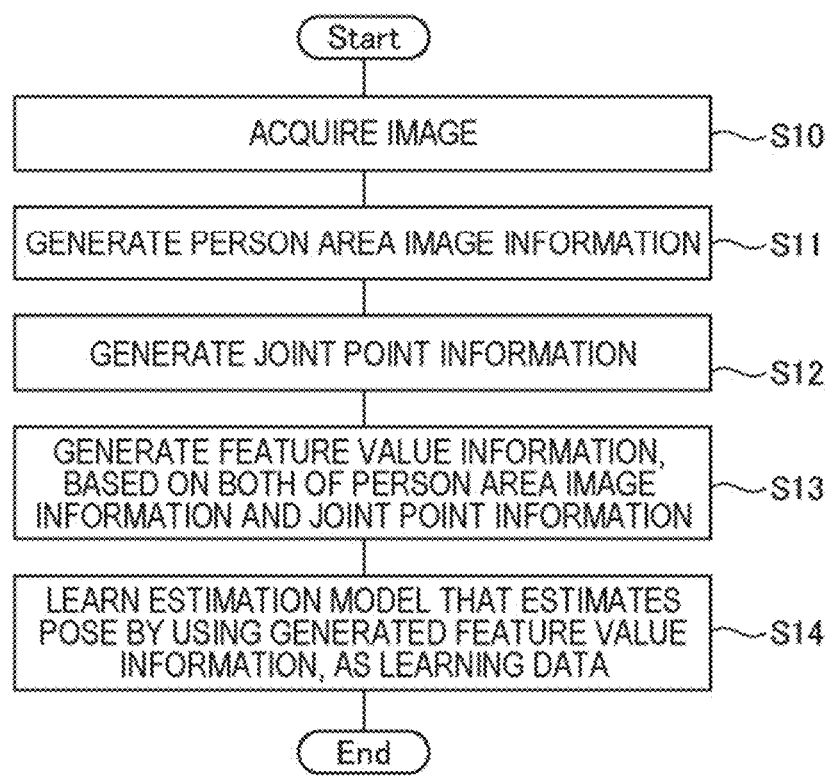
FIG. 7 is a flowchart illustrating one example of a flow of processing of the learning apparatus according to the present example embodiment.

Next, one example of a flow of processing of the learning apparatus 20 is described based on a flowchart in FIG. 7.

When acquiring an image to be processed (S10), the learning apparatus 20 extracts a person area from the image to be processed, and generates person area image information (a R image, a G image, and a B image), based on an image of the extracted person area (S11). Further, the learning apparatus 20 extracts a joint point of a person from the image to be processed, and generates joint point information (M joint point position images), based on the extracted joint point (S12). Note that, an order of processing of S11 and S12 may be the order illustrated in FIG. 7, or may be an order opposite to the order. Further, processing of S11 and S12 may be concurrently performed.

Next, the learning apparatus 20 generates feature value information, based on both of the person area image information generated in S11 and the joint point information generated in S12 (S13). Specifically, the learning apparatus 20 generates a feature value map (feature value information) by convoluting a R image, a G image, a B image, and M joint point position images.

Next, the learning apparatus 20 learns an estimation model that estimates a pose by using the feature value information generated in S13 as learning data (S14). Specifically, the learning apparatus 20 acquires an estimation result (class classification result) by inputting the feature value information generated in S13 to the estimation model. Then, the learning apparatus 20 adjusts a parameter of the estimation model, based on a collation result between the estimation result and a correct answer label.

The learning apparatus 20 repeats similar processing thereafter.

Advantageous Effect

The learning apparatus 20 according to the present example embodiment performs characteristic processing of generating feature value information by convoluting person area image information and joint point information, and learning the feature value information by a Transformer provided with a self-attention mechanism. According to the learning apparatus 20 as described above, accuracy of pose estimation is improved, as described in the following verification result.

Second Example Embodiment

Figure 8:
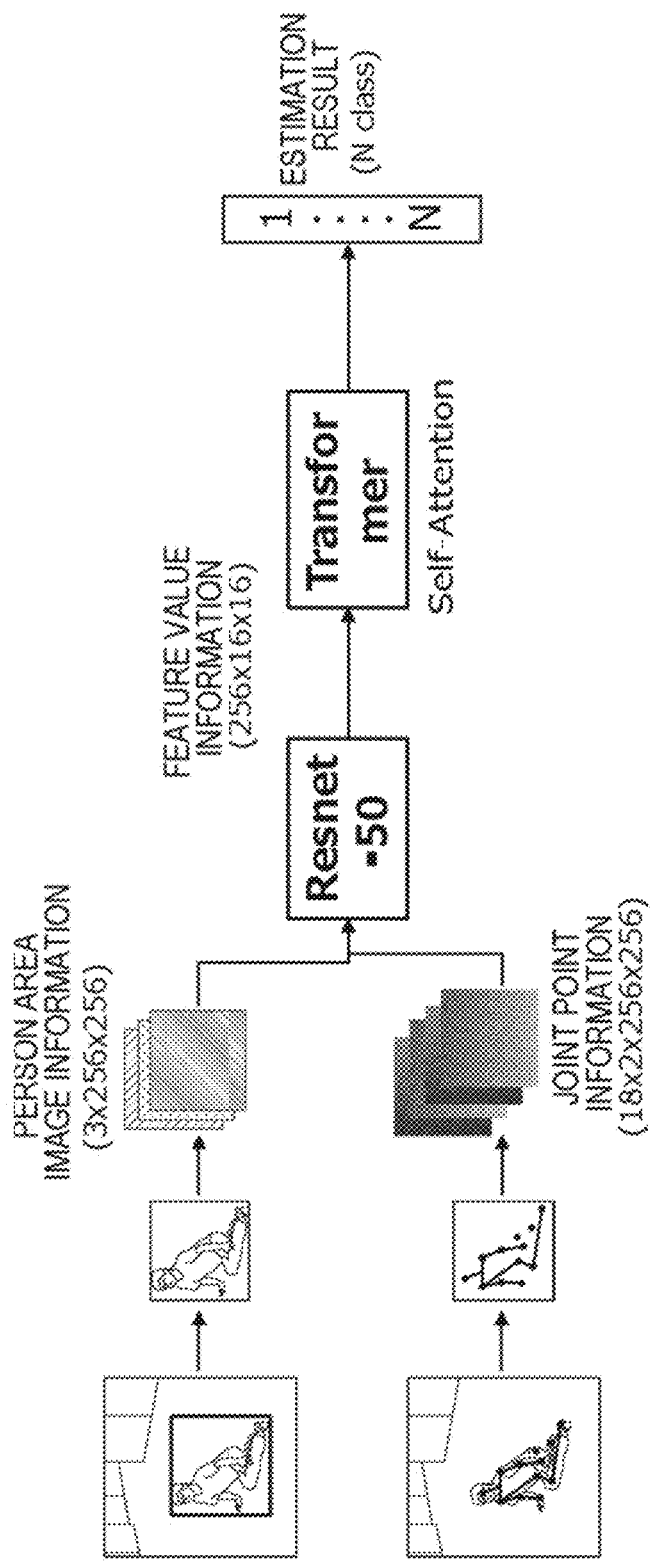
FIG. 8 is a diagram illustrating an overall image of processing to be performed by the learning apparatus according to the present example embodiment.
Figure 9:
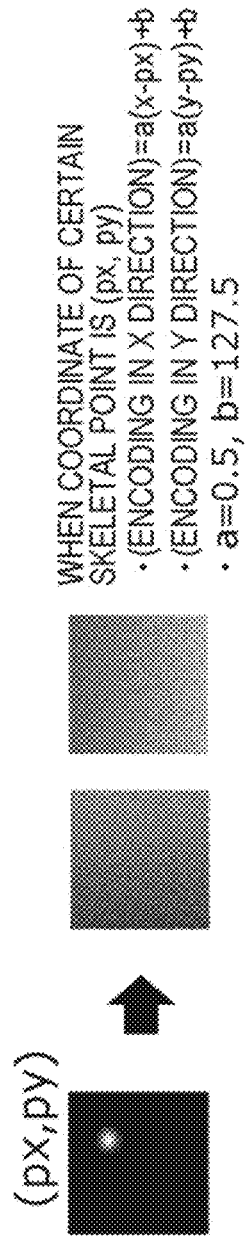
FIG. 9 is a diagram illustrating processing of the joint point information generation unit according to the present example embodiment.

FIG. 8 illustrates an overall image of processing to be performed by a learning apparatus according to the present example embodiment. As illustrated in FIG. 9, the present example embodiment is different from the first example embodiment in a content of joint point information. The other contents are the same as those in the first example embodiment.

Herein, an example of a method of generating a joint point position image according to the present example embodiment is described. First, a joint point information generation unit determines a score for each of a plurality of coordinates in an image of an above-described extracted person area. In the present example embodiment, a score (fixed value) of a coordinate associated with a position of a joint point, and an arithmetic equation that computes a score of other coordinate from a value of the coordinate associated with the position of the joint point are defined in advance. FIG. 9 illustrates one example of the arithmetic equation.

In FIG. 9, (px, py) is a value of a coordinate associated with a position of a joint point. Further, (encoding in X direction) and (encoding in Y direction) are a score of each coordinate. Values a and b are predetermined fixed values.

In a case of this example, an arithmetic equation that computes a score of other coordinate includes:
a first arithmetic equation that computes a score of other coordinate from a x coordinate value of a coordinate associated with a position of a joint point; and
a second arithmetic equation that computes a score of other coordinate from a y coordinate value of the coordinate associated with the position of the joint point.

Then, the joint point information generation unit 22 performs both of:
processing of computing a score of other coordinate, based on the x coordinate value of the coordinate associated with the position of the joint point and the first arithmetic equation, and generating, as a joint point position image, a first joint point position image in which a score of each coordinate is represented by a heatmap; and
processing of computing a score of other coordinate, based on the y coordinate value of the coordinate associated with the position of the joint point and the second arithmetic equation, and generating, as a joint point position image, a second joint point position image in which a score of each coordinate is represented by a heatmap.

Specifically, in the present example embodiment, the joint point information generation unit 22 generates two joint point position images (a first joint point position image and a second joint point position image) in associated with one joint point. As illustrated in FIG. 8, joint point information to be generated in the present example embodiment becomes, for example, 18×2×256×256.

Note that, although not illustrated in FIG. 9, a score of a coordinate in which a y coordinate value matches is the same in the first joint point position image. Further, a score of a coordinate in which a x coordinate value matches is the same in the second joint point position image. In a case of the example illustrated in FIG. 9, the joint point information generation unit 22 determines a score of each coordinate, based on the illustrated arithmetic equation and the condition.

Other configuration of the learning apparatus 20 according to the present example embodiment is similar to that in the first example embodiment.

As described in the following verification result, according to the learning apparatus 20 of the present example embodiment, accuracy of pose estimation is improved, as compared with the learning apparatus 20 according to the first example embodiment.

Further, the learning apparatus 20 according to the present example embodiment is superior in the following points, as compared with the learning apparatus 20 according to the first example embodiment.

(1) "A correlation between any skeletal points can be referred to from an initial stage of a network without depending on a positional relation between joint points."

In a case of the method according to the first example embodiment, there is a problem that, when a distance between joint points is far, in convolution processing by ResNet-50, a correlation between the joint points cannot be referred to unless processing proceeds to a latter-stage layer (in which both of the joint points lie in a receptive field of a network). This may complicate learning, and lead to a difficulty in learning and accuracy lowering. In contrast, giving a predetermined score based on a coordinate value of a joint point to a coordinate that is not associated with a position of a joint point as described in the present example embodiment, it becomes possible to refer to a correlation between any skeletal points from an initial stage of a network without depending on a positional relation between joint points. Consequently, inconvenience involved in the above-described method according to the first example embodiment can be reduced.

(2) "A differential operation is unnecessary in referring to positional relation between joint points"

A relative position of a joint point viewed from a certain point essentially becomes two-dimensional information such as an angle and a distance, or Δx and Δy. In a case of the method according to the first example embodiment, since there is only one-dimensional information for each pixel, a differential operation is necessary to extract two-dimensional information from the one-dimensional information. This may complicate learning, and lead to a difficulty in learning and accuracy lowering. In contrast, by giving a predetermined score based on a coordinate value of a joint point to a coordinate that is not associated with a position of a joint point as described in the present example embodiment, it becomes possible to recognize a relative position of a joint point viewed from a certain point, based on the score. Specifically, it becomes possible to recognize a relative position of a joint point viewed from a certain point without a cumbersome differential operation. Consequently, inconvenience involved in the above-described method according to the first example embodiment can be reduced.

(3) "A joint point position image can be generated at a high speed"

In one example according to the first example embodiment, a joint point position image is generated by using, for example, a Gaussian distribution or the like. In this case, arithmetic processing becomes complicated, and a time required for image generation increases. In contrast, in a case of the present example embodiment, for example, as illustrated in FIG. 9, it is possible to generate a joint point position image, based on an arithmetic result by a linear formula. Therefore, inconvenience involved in the above-described method according to the first example embodiment can be reduced.

(4) "Accuracy is secured even when a size of a joint point position image is small"

In a case of the method according to the first example embodiment, since information is extracted by a differential operation, when an image size of a joint point position image is reduced, information accuracy is lowered. In contrast, in a case of the present example embodiment, since necessary information is already decoded, accuracy is less likely to be lowered even in a small image such as an image having a size of 64×64, 32×32, or the like, and reduction of a computation resource and high-speed computation are enabled.

Third Example Embodiment

Figure 10:
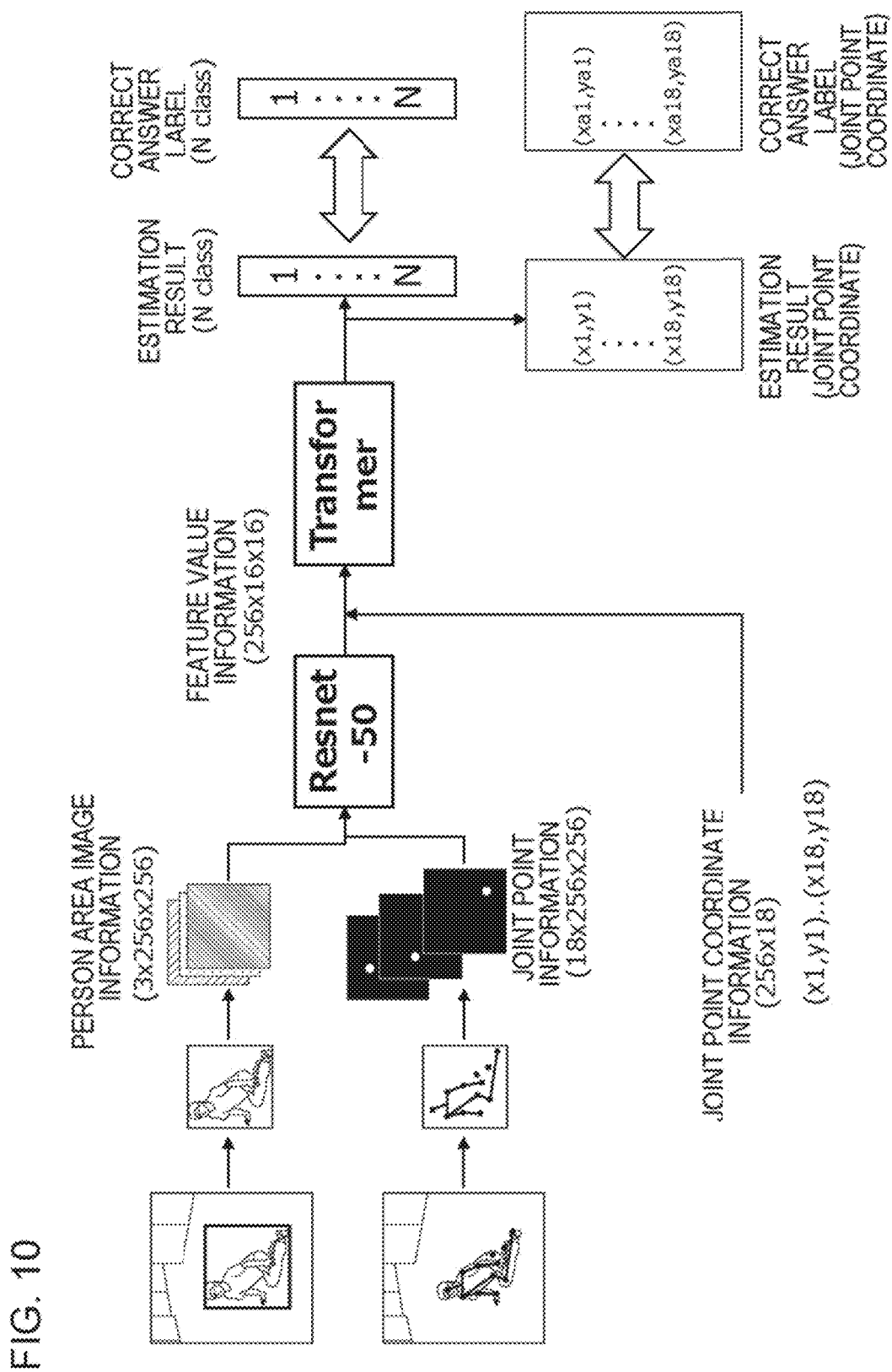
FIG. 10 is a diagram illustrating an overall image of processing to be performed by the learning apparatus according to the present example embodiment.

FIG. 10 illustrates an overall image of processing to be performed by a learning apparatus 20 according to the present example embodiment. As illustrated in FIG. 10, in the present example embodiment, joint point coordinate information indicating a coordinate value of a joint point of a person extracted by a joint point information generation unit 22 is used in learning an estimation model. Specifically, feature value information is generated by also using joint point coordinate information (integrating joint point coordinate information and an output from Resnet-50), and the feature value information is input to a Transformer. Then, an estimation result of a coordinate value of a joint point is further output from the Transformer, in addition to an estimation result of class classification. Then, in adjustment of a parameter of the estimation model, a collation result between the estimation result of the coordinate value of the joint point, and a correct answer label is further used, in addition to a collation result between the estimation result of class classification and a correct answer label. In the following, details are described.

A feature value information generation unit 23 generates feature value information, based on person area image information, joint point information, and joint point coordinate information. The person area image information and the joint point information are as described in the first example embodiment and the second example embodiment. FIG. 10 illustrates joint point information generated by the method described in the first example embodiment, alternatively, joint point information generated by the method described in the second example embodiment may be used.

The joint point coordinate information indicates a coordinate value of a joint point of a person extracted by the joint point information generation unit 22, more specifically, a coordinate value of each joint point in an image of a person area extracted by a person area image information generation unit 21. Note that, although the joint point information and the joint point coordinate information are common in a point that the information indicates a position of a joint point, the former and the latter are different from each other in a point that the former is imaged information, and the latter is information indicating a coordinate value.

A learning unit 24 learns an estimation model in which feature value information is an input, and a pose estimation result and a coordinate value of a joint point are outputs. The estimation model is a Transformer provided with a self-attention mechanism. Since details on the estimation model are disclosed in NPL 1, description thereof is omitted herein. The estimation model outputs, as an estimation result, a certainty of each of N poses (classes) that are defined in advance (a certainty with which a person included in an image to be processed takes each pose). Further, the estimation model outputs, as an estimation result, a coordinate value of a joint point.

The learning unit 24 acquires an estimation result (a class classification result and a coordinate value of a joint point) by inputting, to the estimation model, feature value information generated by the feature value information generation unit 23. Then, the learning unit 24 adjusts a parameter of the estimation model, based on both of a collation result between the class classification result (estimation result) and a correct answer label, and a collation result between the coordinate value of the joint point (estimation result) and a correct answer label. The learning processing can be achieved based on a conventional technique.

Other configuration of the learning apparatus 20 according to the present example embodiment is similar to that in the first and second example embodiments.

According to the learning apparatus 20 of the present example embodiment, an advantageous effect similar to that in the first and second example embodiments is achieved. Further, according to the learning apparatus 20 of the present example embodiment in which an estimation result of a coordinate value of a joint point is also used in learning an estimation model, estimation accuracy is improved.

Fourth Example Embodiment

A pose estimation apparatus 10 according to the present example embodiment has a function of estimating a pose of a person included in an image to be processed by using an estimation model learned by the learning apparatus 20 described in the first to third example embodiments.

Figure 11:
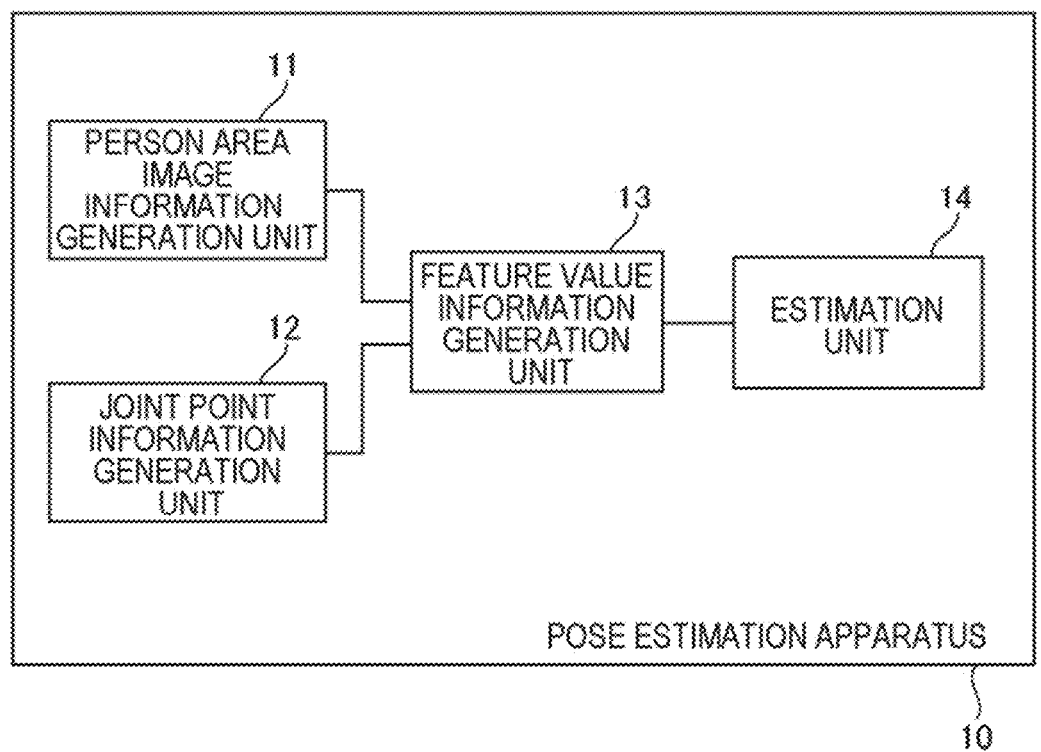
FIG. 11 is one example of a functional block diagram of the pose estimation apparatus according to the present example embodiment.

FIG. 11 illustrates one example of a functional block diagram of the pose estimation apparatus 10. As illustrated in FIG. 11, the pose estimation apparatus 10 includes a person area image information generation unit 11, a joint point information generation unit 12, a feature value information generation unit 13, and an estimation unit 14.

The person area image information generation unit 11 performs processing similar to the processing by the person area image information generation unit 21 described in the first to third example embodiments. The joint point information generation unit 12 performs processing similar to the processing by the joint point information generation unit 22 described in the first to third example embodiments. The feature value information generation unit 13 performs processing similar to the processing by the feature value information generation unit 23 described in the first to third example embodiments.

The estimation unit 14 estimates a pose of a person included in an image to be processed, based on an estimation model learned by the learning apparatus 20 described in the first to third example embodiments. By inputting, to the estimation model, feature value information generated by the feature value information generation unit 13, a certainty of each of N poses (classes) that are defined in advance (a certainty with which a person included in the image to be processed takes each pose) is acquired as an estimation result. The estimation unit 14 estimates a pose of a person included in the image to be processed, based on the estimation result. For example, the estimation unit 14 may estimate, as a pose of a person included in the image to be processed, a pose having a highest certainty, or estimate by another method.

Figure 12:
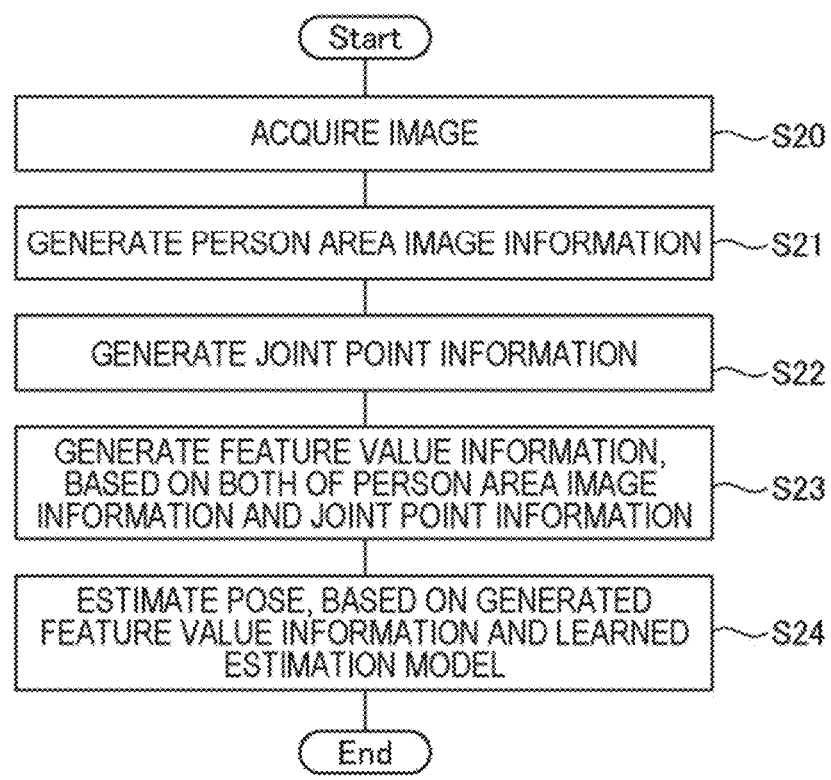
FIG. 12 is a flowchart illustrating one example of a flow of processing of the pose estimation apparatus according to the present example embodiment.

Next, one example of a flow of processing of the pose estimation apparatus 10 is described by using a flowchart in FIG. 12.

When acquiring an image to be processed (S20), the pose estimation apparatus 10 extracts a person area from the image to be processed, and generates person area image information (a R image, a G image, and a B image), based on an image of the extracted person area (S21). The image to be processed is a still image, an image corresponding to one frame of a moving image, and the like. Further, the pose estimation apparatus 10 extracts a joint point of a person from the image to be processed, and generates joint point information (M joint point position images), based on the extracted joint point (S22). Note that, an order of processing of S21 and S22 may be the order illustrated in FIG. 12, or may be an order opposite to the order. Further, processing of S21 and S22 may be concurrently performed.

Next, the pose estimation apparatus 10 generates feature value information, based on both of the person area image information generated in S21, and the joint point information generated in S22 (S23). Specifically, the pose estimation apparatus 10 generates a feature value map (feature value information) by convoluting a R image, a G image, a B image, and M joint point position images.

Next, the pose estimation apparatus 10 estimates a pose of a person included in the image to be processed, based on the feature value information generated in S23, and the estimation model learned by the learning apparatus 20 described in the first to third example embodiments (S24). Specifically, the pose estimation apparatus 10 inputs the feature value information generated in S23 to the estimation model. The estimation model outputs, as an estimation result, a certainty of each of N poses (classes) that are defined in advance (a certainty with which a person included in the image to be processed takes each pose). The pose is, for example, falling, crouching, sitting, standing, walking, holding one's head, turning one's hand, shaking one's arm, and the like, however, the pose is not limited thereto. The pose estimation apparatus 10 estimates a pose of a person included in the image to be processed, based on the estimation result. For example, the pose estimation apparatus 10 may estimate, as a pose of a person included in the image to be processed, a pose having a highest certainty, or estimate by another method.

Note that, although not illustrated, a pose estimation result may be displayed on a display apparatus such as a display. The display apparatus may display, in addition to a pose estimation result, an image/video captured by a camera, an image of a person area, an image indicating an extracted joint point, a heatmap, and the like. Further, the pose estimation result may be displayed, in an overlapping manner, on an image/video captured by a camera, an image of a person area, an image indicating an extracted joint point, a heatmap, and the like.

Next, one example of a hardware configuration of the pose estimation apparatus 10 is described. FIG. 2 is a diagram illustrating a hardware configuration example of the pose estimation apparatus 10. Each functional unit included in the pose estimation apparatus 10 is achieved by any combination of hardware and software, mainly including a central processing unit (CPU) of any computer, a memory, a program loaded in a memory, a storage unit (capable of storing, in addition to a program stored in advance at a shipping stage of an apparatus, a program downloaded from a storage medium such as a compact disc (CD), a server on the Internet, and the like) such as a hard disk storing the program, and an interface for network connection. It is understood by a person skilled in the art that there are various modification examples as a method and an apparatus for achieving the configuration.

As illustrated in FIG. 2, the pose estimation apparatus 10 includes a processor 1A, a memory 2A, an input/output interface 3A, a peripheral circuit 4A, and a bus 5A. The peripheral circuit 4A includes various modules. The pose estimation apparatus 10 does not have to include the peripheral circuit 4A. Note that, the pose estimation apparatus 10 may be configured by a plurality of apparatuses that are physically and/or logically separated, or may be configured by one apparatus that is physically and/or logically integrated. In the former case, each of the plurality of apparatuses constituting the pose estimation apparatus 10 can include the above-described hardware configuration.

The pose estimation apparatus 10 according to the present example embodiment described above performs characteristic processing of generating feature value information by convoluting person area image information and joint point information before performing class classification, and performing class classification by using the feature value information. According to the pose estimation apparatus 10 as described above, accuracy of pose estimation is improved, as described in the following verification result.

Verification Result

Figure 13:
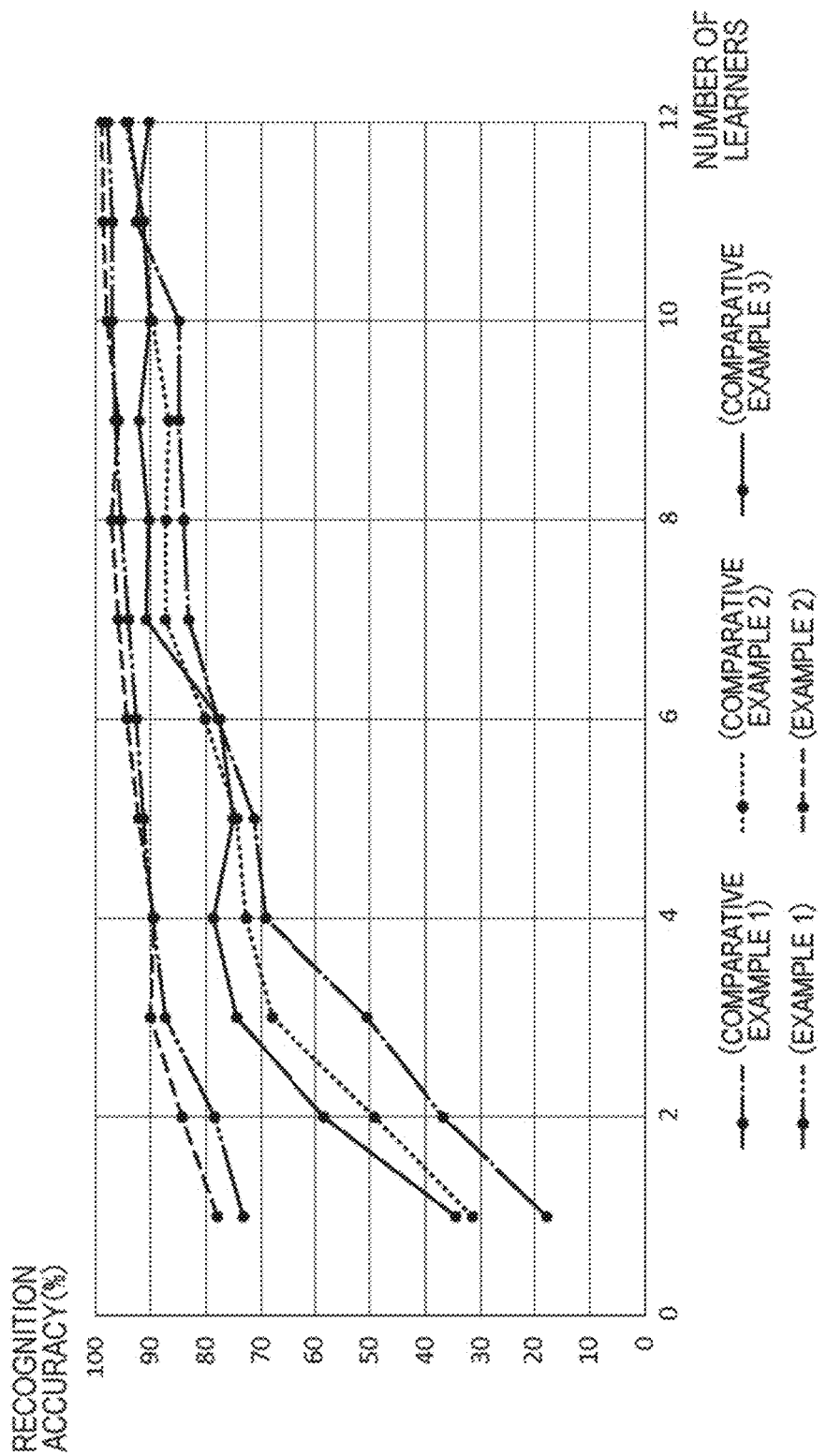
FIG. 13 is a diagram illustrating an advantageous effect of the learning apparatus and the pose estimation apparatus according to the present example embodiment.

FIG. 13 illustrates a verification result of examples 1 and 2, and comparative examples 1 to 3. A horizontal axis denotes the number of learners (number of learned images), and a vertical axis denotes recognition accuracy (%).

The example 1 is an example in which an estimation model is learned by the method described in the first example embodiment.

The example 2 is an example in which an estimation model is learned by the method described in the second example embodiment.

The comparative example 1 is an example in which an estimation model is learned only by person area image information, without using joint point information.

The comparative example 2 is an example in which an estimation model is learned only by joint point information, without using person area image information.

The comparative example 3 is an example associated with the method disclosed in PTL 1. Specifically, the comparative example 3 is an example in which a class classification result acquired by an estimation model learned only by person area image information without using joint point information, and a class classification result acquired by an estimation model learned only by joint point information without using person area image information are integrated.

As illustrated in FIG. 13, in the examples 1 and 2, high recognition accuracy is acquired, as compared with the comparative examples 1 to 3, regardless of whether the number of learners is large or small. Whereas, in the comparative examples 1 to 3, recognition accuracy is considerably lowered, when the number of learners is small, in the examples 1 and 2, recognition accuracy of a certain high level is acquired even when the number of learners is small. A difference in recognition accuracy between the examples 1 and 2, and the comparative examples 1 to 3 is conspicuous, when the number of learners is small.

Further, it is clear, from FIG. 13, that high recognition accuracy is acquired in the example 2, as compared with the example 1.

In the foregoing, example embodiments according to the present invention have been described with reference to the drawings, however, these example embodiments are an exemplification of the present invention, and various configurations other than the above can be employed.

Note that, in the present specification, "acquisition" includes at least one of "acquisition of data stored in another apparatus or a storage medium by an own apparatus (active acquisition)", based on a user input, or based on a command of a program, for example, requesting or inquiring another apparatus and receiving, accessing to another apparatus or a storage medium and reading, and the like, "input of data to be output from another apparatus to an own apparatus (passive acquisition)", based on a user input, or based on a command of a program, for example, receiving data to be distributed (or transmitted, push-notified, or the like), and acquiring by selecting from among received data or information, and "generating new data by editing data (such as converting into a text, rearranging data, extracting a part of pieces of data, and changing a file format) and the like, and acquiring the new data".

A part or all of the above-described example embodiments may also be described as the following supplementary notes, but is not limited to the following.

1. A pose estimation apparatus including:
   a person area image information generation means for extracting a person area from an image, and generating person area image information, based on an image of the extracted person area;
   a joint point information generation means for extracting a joint point of a person from the image, and generating joint point information, based on the extracted joint point;
   a feature value information generation means for generating feature value information, based on both of the person area image information and the joint point information; and
   an estimation means for estimating a pose of a person included in the image, based on an estimation model in which the feature value information is an input, and a pose estimation result is an output.

2. The pose estimation apparatus according to supplementary note 1, wherein
   the joint point information generation means
   extracts M joint points of a person, and
   generates, as the joint point information, a plurality of joint point position images, each of which is associated with each of M joint points, and each of which indicates a position of each of M joint points.

3. The pose estimation apparatus according to supplementary note 2, wherein
   a score of a coordinate associated with a position of the joint point, and a score of other coordinate are defined in advance by a fixed value, and
   the joint point information generation means generates the joint point position image in which the score of each coordinate is represented by a heatmap.

4. The pose estimation apparatus according to supplementary note 2, wherein
   a score of a coordinate associated with a position of the joint point and an arithmetic equation that computes a score of other coordinate from a value of a coordinate associated with a position of the joint point are defined in advance, and
   the joint point information generation means
   computes a score of the other coordinate, based on a value of a coordinate associated with a position of the joint point and the arithmetic equation, and
   generates the joint point position image in which the score of each coordinate is represented by a heatmap.

5. The pose estimation apparatus according to supplementary note 4, wherein
   the arithmetic equation includes a first arithmetic equation that computes a score of other coordinate from a x coordinate value of a coordinate associated with a position of the joint point, and a second arithmetic equation that computes a score of other coordinate from a y coordinate value of a coordinate associated with a position of the joint point, and
   the joint point information generation means
   computes a score of the other coordinate, based on a x coordinate value of a coordinate associated with a position of the joint point and the first arithmetic equation, and generates, as the joint point position image, a first joint point position image in which the score of each coordinate is represented by a heatmap, and computes a score of the other coordinate, based on a y coordinate value of a coordinate associated with a position of the joint point and the second arithmetic equation, and generates, as the joint point position image, a second joint point position image in which the score of each coordinate is represented by a heatmap.

6. The pose estimation apparatus according to any one of supplementary notes 1 to 5, wherein the person area image information generation means extracts the person area from the image by using a result of person detection processing or a result of joint point extraction processing.

7. The pose estimation apparatus according to any one of supplementary notes 1 to 6, wherein the estimation model includes a self-attention mechanism.

8. A pose estimation method including:
by a computer,
extracting a person area from an image, and generating person area image information, based on an image of the extracted person area;
extracting a joint point of a person from the image, and generating joint point information, based on the extracted joint point;
generating feature value information, based on both of the person area image information and the joint point information; and
estimating a pose of a person included in the image, based on an estimation model in which the feature value information is an input, and a pose estimation result is an output.

9. A program causing a computer to function as:
a person area image information generation means for extracting a person area from an image, and generating person area image information, based on an image of the extracted person area;
a joint point information generation means for extracting a joint point of a person from the image, and generating joint point information, based on the extracted joint point;
a feature value information generation means for generating feature value information, based on both of the person area image information and the joint point information; and
an estimation means for estimating a pose of a person included in the image, based on an estimation model in which the feature value information is an input, and a pose estimation result is an output.

10. A learning apparatus including:
a person area image information generation means for extracting a person area from an image, and generating person area image information, based on an image of the extracted person area;
a joint point information generation means for extracting a joint point of a person from the image, and generating joint point information, based on the extracted joint point;
a feature value information generation means for generating feature value information, based on both of the person area image information and the joint point information; and
a learning means for learning an estimation model in which the feature value information is an input, and a pose estimation result is an output.

REFERENCE SIGNS LIST

10 Pose estimation apparatus
11 Person area image information generation unit
12 Joint point information generation unit
13 Feature value information generation unit
14 Estimation unit
20 Learning apparatus
21 Person area image information generation unit
22 Joint point information generation unit
23 Feature value information generation unit
24 Learning unit
1A Processor
2A Memory
3A Input/output I/F
4A Peripheral circuit
5A Bus

What is claimed is:

1. A pose estimation apparatus comprising:
at least one memory storing one or more instructions; and
at least one processor configured to execute the one or more instructions to:
extract a person area from an image, and generate person area image information based on the extracted person area;
extract joint points of a person from the image, where M is an integer greater than zero, and where scores of coordinates respectively associated with positions of the M joint points and a score of another coordinate are defined in advance by fixed values;
generate, as joint point information and based on the extracted M joint points, a plurality of joint point position images respectively associated with and indicate the positions of the M joint points, wherein the scores of the coordinates are represented as heatmaps in the joint point position images;
generate feature value information based on both the person area image information and the joint point information; and
estimate a pose of a person included in the image, based on an estimation model to which the feature value information is input and from which a pose estimation result is output.

2. The pose estimation apparatus according to claim 1, wherein
the processor is further configured to execute the one or more instructions to extract the person area from the image by using a result of person detection processing or a result of joint point extraction processing.

3. The pose estimation apparatus according to claim 1, wherein
the estimation model includes a self-attention mechanism.

4. A pose estimation method performed by a computer and comprising:
extracting a person area from an image, and generate person area image information based on the extracted person area;
extracting M joint points of a person from the image, where M is an integer greater than zero, and where scores of coordinates respectively associated with positions of the M joint points and a score of another coordinate are defined in advance by fixed values;
generating, as joint point information and based on the extracted M joint points, a plurality of joint point position images respectively associated with and indicate the positions of the M joint points, wherein the scores of the coordinates are represented as heatmaps in the joint point position images;
generating feature value information based on both the person area image information and the joint point information; and estimating a pose of a person included in the image, based on an estimation model to which the feature value information is input and from which a pose estimation result is output.

5. A non-transitory computer-readable recording medium storing instructions executable by a processor to perform the method of claim 4.

6. A learning apparatus comprising:

at least one memory storing one or more instructions; and at least one processor configured to execute the one or more instructions to:

extract a person area from an image, and generate person area image information based on the extracted person area;

extract M joint points of a person from the image, where M is an integer greater than zero, and where scores of coordinates respectively associated with positions of the M joint points and a score of another coordinate are defined in advance by fixed values;

generate, as joint point information and based on the extracted M joint points, a plurality of joint point position images respectively associated with and indicate the positions of the M joint points, wherein the scores of the coordinates are represented as heatmaps in the joint point position images;

generate feature value information based on both the person area image information and the joint point information; and learn an estimation model to which the feature value information is input and from which a pose estimation result is output.

* * * * *